United States Patent [19]

Haferl

[11] Patent Number: 4,532,457
[45] Date of Patent: Jul. 30, 1985

[54] TELEVISION RECEIVER STANDBY CIRCUIT

[75] Inventor: Peter E. Haferl, Adliswil, Switzerland

[73] Assignee: RCA Corporation, Princeton, N.J.

[21] Appl. No.: 382,493

[22] Filed: May 27, 1982

[30] Foreign Application Priority Data

Jan. 29, 1982 [GB] United Kingdom ............. 8202664

[51] Int. Cl.³ .................................................. H01J 29/00
[52] U.S. Cl. ..................................... 315/411; 315/380; 358/190; 358/194.1
[58] Field of Search ................... 315/411, 408, 380; 358/190, 194.1, 210

[56] References Cited

U.S. PATENT DOCUMENTS

| 3,767,967 | 10/1973 | Luz | 315/94 |
| 3,801,856 | 4/1974 | Griepentrog et al. | 315/380 |
| 3,882,401 | 5/1975 | Cleland | 325/492 |
| 3,956,669 | 5/1976 | Del Ciello | 315/411 |
| 4,024,577 | 5/1977 | Diethelm | 358/190 |
| 4,176,304 | 11/1979 | Scott | 315/411 |

FOREIGN PATENT DOCUMENTS 2624965 12/1977 Fed. Rep. of Germany .
2458302 6/1981 Fed. Rep. of Germany .
1589832 5/1981 United Kingdom .

OTHER PUBLICATIONS

Article in Funkschau, 1975, No. 5, pp. 40–43, Entitled, A Blocking Oscillator Power Module with Network Isolation, by R. Dangschat et al.

Primary Examiner—Theodore M. Blum
Assistant Examiner—Gregory C. Issing
Attorney, Agent, or Firm—Eugene M. Whitacre; Paul J. Rasmussen; Joseph J. Laks

[57] ABSTRACT

A deflection generator of a television receiver includes a trace switch that during normal mode of operation is switched at a deflection rate to generate scanning current in a deflection winding. The deflection generator includes a retrace capacitance for forming a retrace resonant circuit with the deflection winding to produce a retrace pulse voltage. A load circuit is coupled to the deflection generator and is energized by the retrace pulse voltage during normal operation. A remote control circuit develops a remote ON-OFF command signal. A standby circuit is series coupled with the deflection generator and is responsive to a remote ON-OFF command signal for producing a substantially short circuited trace switch upon receipt of the OFF-state of the command signal. The retrace pulse voltage collapses and places the load circuit in a standby mode of operation.

22 Claims, 4 Drawing Figures

TELEVISION RECEIVER STANDBY CIRCUIT

This invention relates to the standby operation of television receivers and, in particular, to a power supply which powers remote control circuits within the television receiver during standby operation. The invention may be used in retrace driven main power supplies, and in particular, may be used in a single conversion system (SICOS) power supply such as described in U.S. patent application Ser. No. 333,610, filed Dec. 22, 1981, by P. E. Haferl, now U.S. Pat. No. 4,484,113, herein incorporated by reference.

Several types of standby television receiver circuits are known. Known, for example, is a main power supply such as a switched mode power supply, a small AC line mains transformer which powers the remote control circuits of the television receiver, and a relay which turns the television receiver on and off. Such a standby circuit may consume only about 6 watts, but is a relatively costly approach to standby power supply.

Another type of standby circuit is a switched mode power supply with an integrated circuit control such as with a TDA4600 control circuit IC, and a relay which turns off most of the switched mode power supply secondary voltages during standby. The switched mode power supply operates at around 70 KHz during standby to obtain the required large range of regulation. Standby dissipation of such a system, however, is relatively large between 10 and 20 watts.

Still another type of standby circuit is a mains transformer coupled to a switched mode regulator without relay. During standby the horizontal oscillator is deenergized by the remote control circuit. The use of a mains transformer is a relatively cumbersome approach to the design of a standby circuit.

A feature of the standby circuit of the invention is the initiation of standby operation by short circuiting the horizontal trace switch by, for example, maintaining the horizontal output transistor continuously in saturation during standby operation. When using a main power supply such as the above referred to SICOS power supply, short circuiting the trace switch results in the SICOS power supply going into free-running oscillation at around the horizontal deflection frequency, with a duty cycle ratio nearly that of the ratio between the trace to retrace intervals. During standby, the power for the remote control circuit flows through the short circuited trace switch from a secondary winding of the flyback transformer. Standby power consumption may be less than 10 watts and typically around 6 watts. Usable power for the remote control circuit may be around 1.5 watts at 12 volts.

Figure 1:
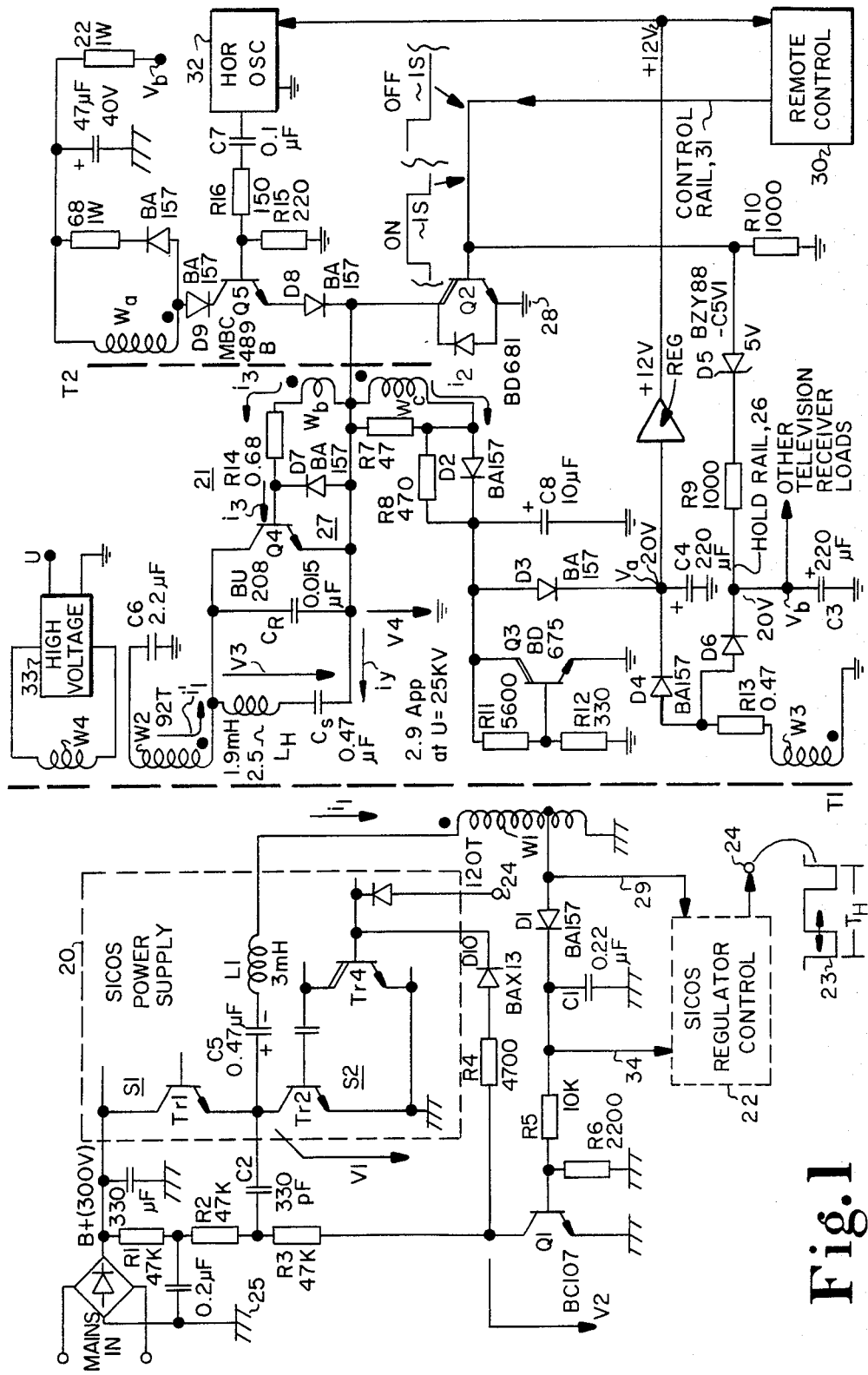
FIG. 1 illustrates a television receiver power supply and deflection circuit with standby remote control circuitry embodying the invention.

In FIG. 1, a SICOS power supply 20, described in the aforementioned U.S. patent application of P. Haferl, operates to transfer power from an unregulated B+ supply terminal to various television receiver load circuits coupled to secondary windings of a flyback transformer T1, including a high voltage ultor load 33 coupled to a high voltage winding W4. During normal mode operation, horizontal retrace pulses, voltage V3 illustrated in FIG. 2c, developed by horizontal deflection generator 21, are transformer coupled from secondary winding W2 of flyback transformer T1 to the primary winding W1.

From the tap of primary winding W1, the positive retrace pulses are peak rectified by a diode D1, filtered by a capacitor C1 and applied to the SICOS regulator control circuit 22 along a signal line 34. Regulator control circuit 22 is synchronized to horizontal deflection by the retrace pulse voltage applied along a signal line 29 to develop pulse-width modulated signals 23 having a duty cycle that varies with variations in retrace pulse voltage amplitude. The pulse-width modulated signals are applied to an input terminal 24 of the SICOS power supply 20 to pulse-width modulate push-pull switches S1 and S2. Each switch comprises a transistor, Tr1 or Tr2, having an antiparallel diode, not illustrated in FIG. 1, coupled between its collector and emitter electrodes. By pulse-width modulating the operation of switches S1 and S2, the retrace pulse amplitude is maintained relatively constant under varying load and B+ voltage conditions.

The positive voltage developed across capacitor C1 holds a transistor Q1 in saturation, thereby bringing its collector voltage to the potential of earth ground 25 and reverse biasing a diode D10. On the secondary side of flyback transformer T1, a standby switching transistor, Darlington transistor Q2, is held in saturation by base current flowing from a hold rail 26 through a resistor R9 and a zener diode D5. Thus, horizontal trace switch 27 and horizontal driver transistor Q5 are connected to chassis ground 28 by way of the conducting, remote control switch Q2.

Figure 2:
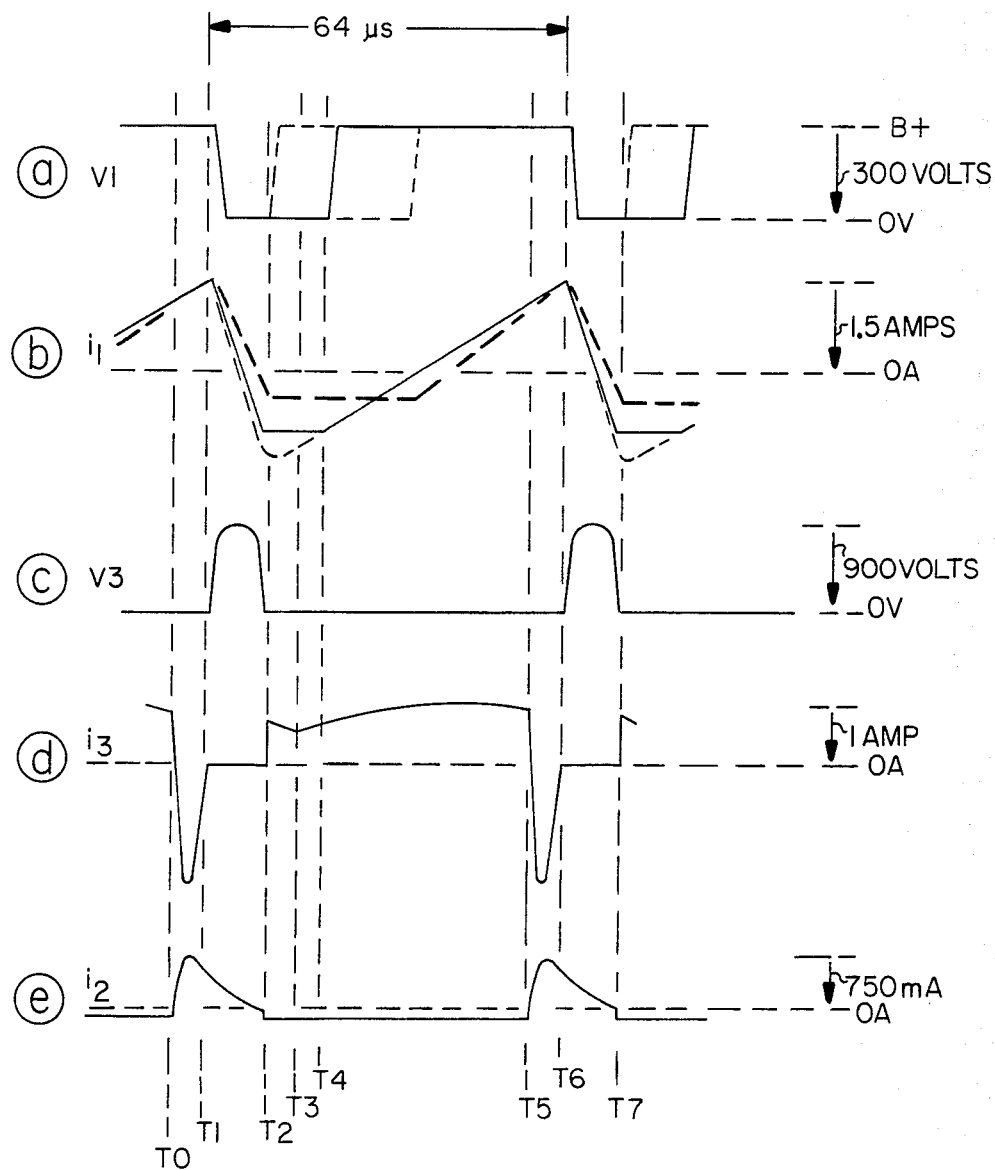
FIG. 2 illustrates waveforms associated with the circuit of FIG. 1 during normal mode operation.

The waveforms of FIGS. 2a-2e illustrate normal mode operation of the SICOS power supply and horizontal deflection circuit of FIG. 1. FIG. 2a illustrates the switching voltage V1 at the junction of output switches S1 and S2 of SICOS power supply 20. The dashed-line waveforms of FIG. 2 indicate the regulation range of the power supply. The solid-line waveforms represent waveforms taken at a typical working point of the power supply.

Figure 4:
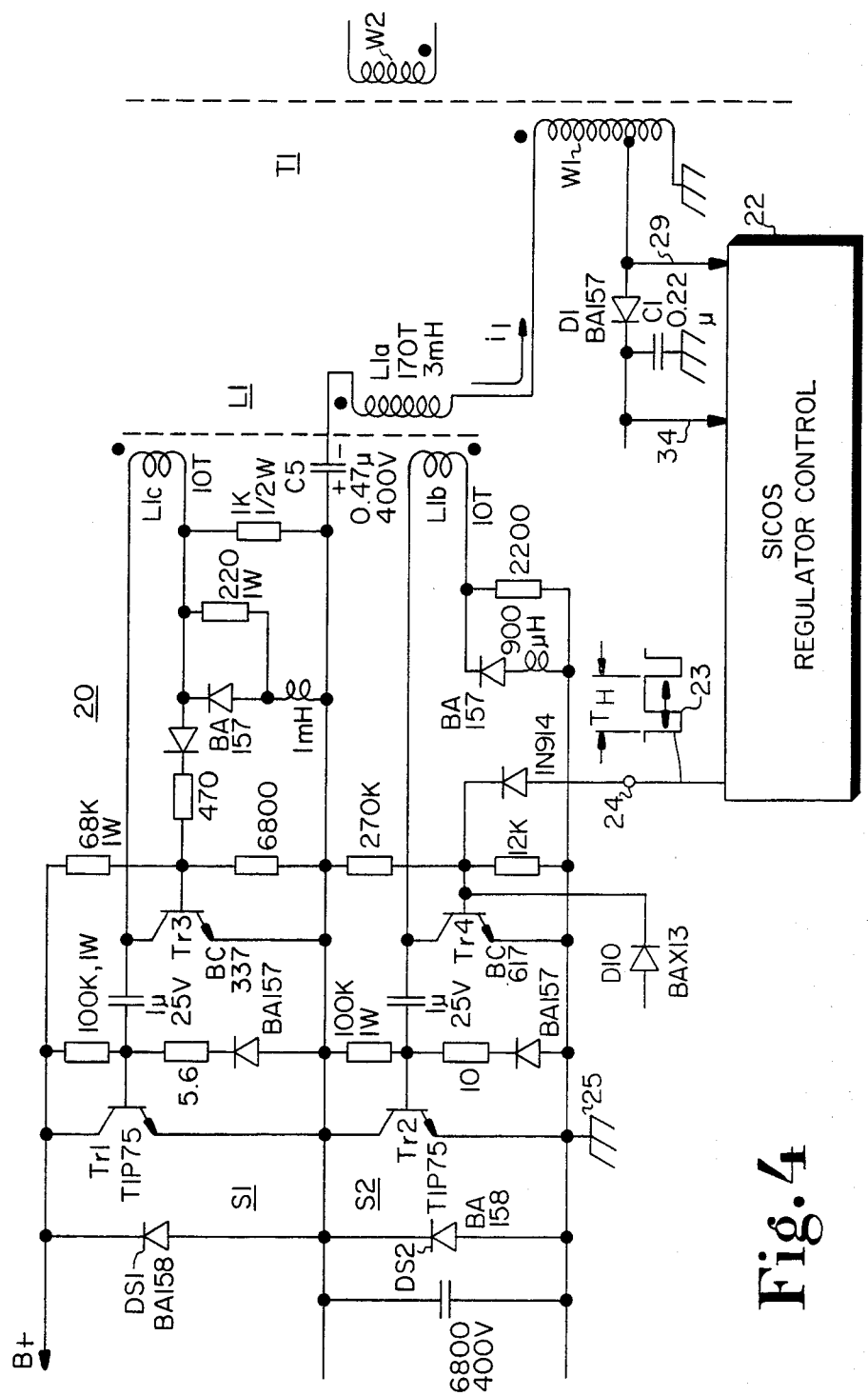
FIG. 4 illustrates a detailed embodiment of the output circuitry of a SICOS power supply.

FIG. 4 illustrates a detailed embodiment of the circuitry of SICOS power supply 20 of FIG. 1. Switch S1 becomes conductive at a controllable instant, $T_4$, within the trace interval of the horizontal deflection cycle, coupling energy storage inductor L1 to the B+ input voltage terminal. Switch S1 becomes conductive because near time $T_4$ the positive-going edges of pulse-width modulated signal 23 has turned on transistor Tr4, thereby turning off transistor Tr2 of switch S2. To maintain the current $i_1$ in main winding L1$a$ of inductor L1, the dotted terminal of winding L1$a$ becomes positive relative to the undotted terminal, thereby forward biasing diode DS1 of switch S1. A now decreasing current in winding L1$a$ flows to the B+ terminal of FIG. 1.

The positive voltage at the dotted terminal of winding L1$a$ induces a positive voltage at the dotted terminal of control winding L1$c$ to forward bias the base-emitter junction of transistor Tr1. Transistor Tr1 takes up current conduction in winding L1$a$ when the current $i_1$ of FIG. 2$b$ becomes positive at some instant after time $T_4$ but within the trace interval $T_2$–$T_6$.

At the end of the trace interval, at time $T_6$, a controllable amount of energy has been stored in inductor L1.

Much of this stored energy is then transferred to the load circuits coupled to flyback transformer T1 during the horizontal retrace interval $T_6$-$T_7$.

At time $T_6$, the positive retrace pulse voltage developed at the dotted terminal of winding W1 of flyback transformer T1 is applied to the undotted terminal of winding L1a of inductor L1 making positive the undotted terminals of winding L1a and control windings L1b and L1c. Transistor Tr3 becomes conductive, turning off transistor Tr1. The positive current $i_1$ is now taken up by diode DS2 of switch S2 until near the center of retrace when transistor Tr2 takes over conduction when current $i_1$ becomes negative. During retrace, a resonant transfer of energy takes place, by way of flyback transformer T1, between inductor L1 and the retrace resonant circuit comprising capacitor $C_R$ and horizontal deflection winding $L_H$ and the load circuits coupled to secondary windings W3 and W4 of flyback transformer T1.

FIG. 2d illustrates the base current $i_3$ in horizontal output transistor Q4, flowing from a winding $W_b$ of a horizontal driver transformer T2. FIG. 2e illustrates the current $i_2$ flowing in a winding $W_c$ of driver transformer T2. Near time $T_0$, a horizontal driver transistor Q5 is turned on, generating a reverse base current $i_3$ that cuts off horizontal output transistor Q4 at time $T_1$. Also beginning near time $T_0$, a current $i_2$ is generated that charges a capacitor C8 through a diode D2. The currents $i_2$ and $i_3$ during normal mode operation are therefore generated by the switching action of horizontal driver transistor Q5.

To switch the television receiver into the standby mode of operation, a remote control circuit 30 applies chassis ground potential for about 1 second duration, as an OFF command signal, to the base of remote control switching transistor Q2 via a control rail 31. With transistor Q2 cut off, the current in winding W2 of flyback transformer T1 is forced to flow to chassis ground 28 via winding $W_c$ of horizontal driver transformer T2. When conventional current $i_1'$ flows out of the dotted terminal of flyback transformer winding W2, the return current path for that current is through horizontal output transistor Q4 into the dotted terminal of winding $W_c$ of driver transformer T2, then through diode D2 to charge capacitor C8 to a positive voltage. When conventional current $i_1'$ flows out of the undotted terminal of flyback transformer winding W2, the return path is through the diode of Darlington transistor Q2, the damper diode D7 of trace switch 27, and the diode formed by the base-collector junction of horizontal output transistor Q4.

The positive current $i_2$ induces in winding $W_b$ of horizontal driver transformer T2 a positive base current $i_3$ for horizontal output transistor Q4. The current $i_3$ keeps horizontal output transistor Q4 conductive. Transformer T2, therefore, serves as a bootstrapping transformer that provides positive feedback from the output of transistor Q4, to keep the transistor in saturation.

During standby, transistor Q4 is either in a condition of saturated forward conduction or in a condition of reverse collector conduction with damper diode D7 also conducting. These conditions produce in effect a short-circuited trace switch 27 connecting the dotted terminal of flyback transformer winding W2 to the dotted terminal of driver transformer winding $W_c$. With trace switch 27 continuously short circuited, the retrace resonant circuit is prevented from forming, thereby collapsing the retrace pulse voltages. The supply currents through diodes D4 and D6 become zero, as well as the supply voltage $V_b$ and the current through hold rail 26. Remote control transistor Q2 therefore remains in cutoff, even after elapse of the aforementioned one-second OFF command signal interval.

The voltage $V_a$ across capacitor C4 is the source voltage for the 12 volt supply rail energizing remote control circuit 30 and horizontal oscillator 32. This voltage is developed, in the standby mode of operation, via diodes D2 and D3, from the positive current of current $i_1'$, that flows in driver transformer winding $W_c$ as the current $i_2$. Horizontal oscillator 32 is in operation during standby to facilitate the turn-on of the television receiver, as explained later. A Darlington transistor Q3 acts as a shunt regulator to limit the voltage across capacitor C8.

On the primary side of flyback transformer T1, as the retrace pulses collapse upon initiation of standby mode of operation, SICOS power supply 20 begins to operate in a free-running mode. The collapse of the retrace pulse voltages disables control circuit 22 and brings transistor Q1 into cutoff. With transistor Q1 cutoff, an RC network comprising resistors R1-R4 and a capacitor C2 is enabled to form an astable multivibrator arrangement with SICOS switches S1 and S2.

Figure 3:
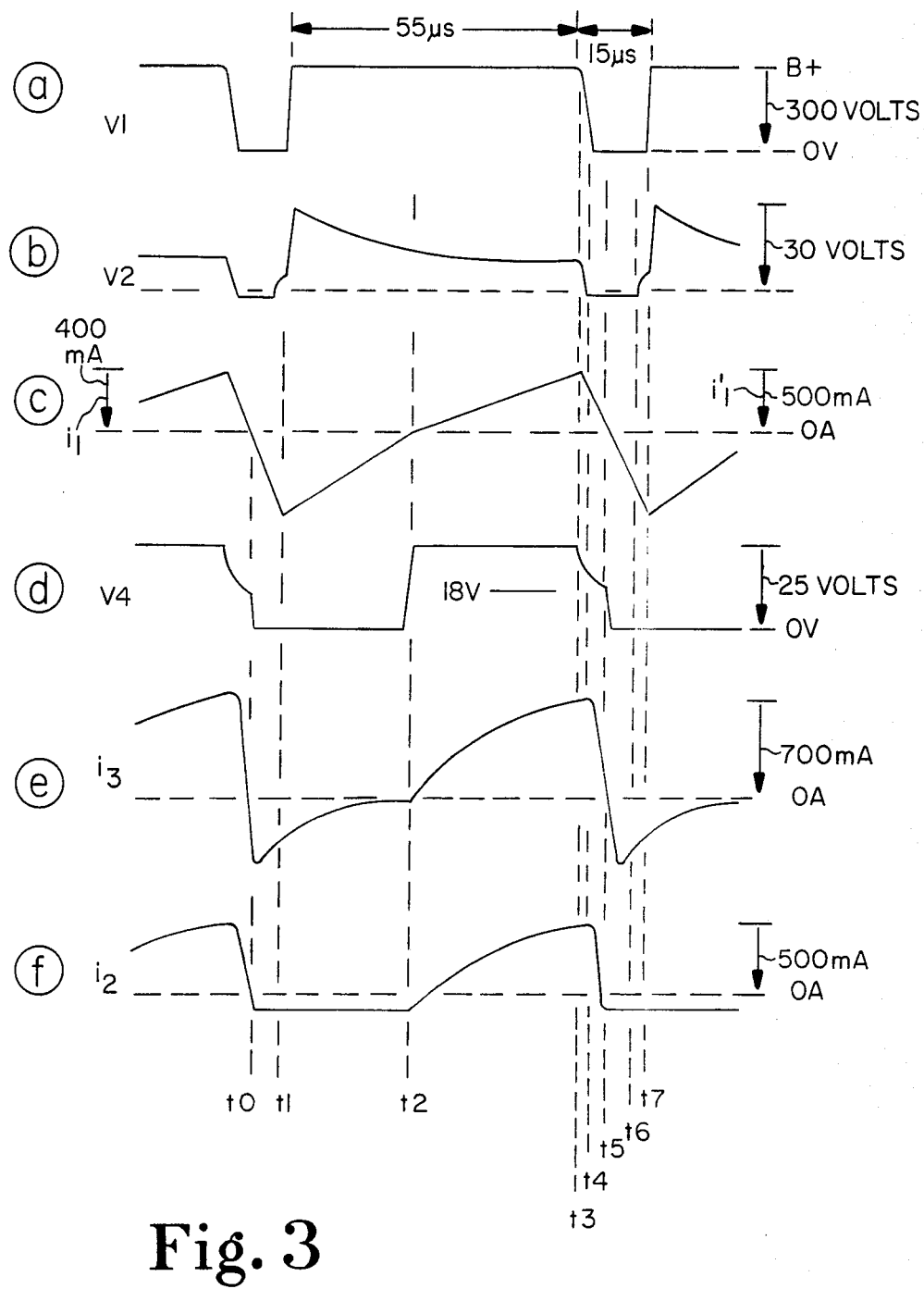
FIG. 3 illustrates waveforms associated with the circuit of FIG. 1 during standby mode of operation.

The waveforms of FIG. 3 illustrate waveforms associated with the circuit of FIG. 1 in the standby mode of operation. As deduced from the voltage V1 of FIG. 3a, after time $t_1$, switch S1 of SICOS power supply 20 is conducting. Also near time $t_1$, the left plate of capacitor C2 is positive relative to the right plate. Therefore, when switch S1 becomes conductive, capacitor C2 begins to discharge through resistors R2 and R3 as indicated in FIG. 3b by the decreasing voltage V2 at the collector of transistor Q1 after time $t_1$.

Switch S1 of SICOS power supply 20 remains conductive due to the regenerative action provided by control windings L1b and L1c of FIG. 4. As deduced from FIG. 3a, switch S1 remains conductive until time $t_3$, at which time transistor Tr1 of switch S1 begins to turn off. By time $t_4$, transistor Tr1 is in cutoff and switch S2 has been turned on due to conduction in diode DS2, thereby bringing the voltage V1 to earth ground potential.

By time $t_4$, capacitor C2 has charged to an opposite polarity voltage such that the right plate of the capacitor is positive relative to the left plate. With the positive, right plate of capacitor C2 clamped to ground by switch S2, the base-collector junction of transistor Q1 becomes forward biased, clamping the voltage V2 to just below ground potential, between times $t_4$ and $t_6$ of FIG. 3b. Between times $t_4$ and $t_6$, capacitor C2 discharges through the base-collector junction of transistor Q1 and through resistor R2 from the B+ terminal. Near time $t_6$, the voltage across capacitor C2 reverses polarity, reverse biasing the base-collector junction of transistor Q1. Capacitor C2 begins to charge from the B+ terminal, charging the left plate of the capacitor positive relative to the right plate.

By time $t_7$ of FIG. 3b, capacitor C2 has charged sufficiently to forward bias diode D10 and turn on control transistor Tr4 of SICOS power supply 20. Turning on control transistor Tr4 turns off output switching transistor Tr2. When Tr2 turns off, diode DS1 of switch S1 is turned on to take up current conduction from main winding L1a of inductor L1 of FIG. 4. The voltage V1 therefore increases to the B+ voltage level as illustrated in FIG. 3a.

The duration of one complete free-running oscillation of switches S1 and S2 is illustratively 70 microseconds, a duration that is near that of the horizontal deflection duration $T_H=64$ microseconds. The 70 microseconds free-running period is selected to be short enough so as not to produce any audible sound emanations in standby mode. Adjustment of the free-running period may be made by adjusting the value of resistor R2 of the astable multivibrator.

FIG. 3c illustrates the current $i_1$ in winding W1 of flyback transformer T1 during standby operation. Because windings W1 and W2 are tightly coupled to each other and have approximately the same number of turns, the current $i_1'$ in winding W2 and thus in the collector of horizontal output transistor Q4 in the standby mode has about the same shape and amplitude as the current $i_1$. Compared to the currents $i_1$ and $i_1'$ during normal mode operation, the currents $i_1$ and $i_1'$ during standby mode of operation are substantially reduced. The power consumption of SICOS power supply 20 during standby is therefore relatively low, illustratively 6 watts.

FIG. 3d illustrates the voltage V4 across remote control switching transistor Q2 during standby operation. Between time $t_0$ and time $t_2$, an interval when the currents in windings W1 and W2 of flyback transformer T1 are negative, the diode of Darlington transistor Q2 is forward biased, clamping the voltage V4 to chassis ground potential. Between time $t_2$ and time $t_3$, the currents $i_1$ and $i_1'$ are positive and ramping upwardly. In this interval the current $i_2$ in winding $W_c$ of transformer T2 is positive, forward biasing diode D2 and charging capacitor C8 to a voltage of approximately 20 volts. In this interval, the voltage V4 is positive and clamped to the voltage level established by the voltages being developed across windings $W_c$ of driver transformer T2 and across capacitor C8.

Near time $t_3$, switch S2 of SICOS power supply 20 becomes conductive, initiating the negatively sloping portion of the currents $i_1$ and $i_1'$. After time $t_3$, the current $i_1'$ flowing to winding $W_c$ of driver transformer T2 causes a reversal in the polarity of the voltage developed across winding $W_c$. The Voltage V4 therefore decreases from time $t_3$ until time $t_5$, the zero-crossover instants of the current $i_1'$. At time $t_5$, the current $i_1'$ becomes negative, forward biasing the diode of Darlington transistor Q2, again clamping the voltage V4 to chassis ground potential.

Because trace switch 27 is a short circuit during standby mode operation, the voltage developed across flyback transformer winding W2 is the same voltage V4 illustrated in FIG. 3d, but at a different, AC, zero volt reference level. Thus, during standby operation, the peak-to-peak voltage across winding W2 is approximately 25 volts, illustratively, compared to 900 volts, illustratively, during normal mode operation, a peak-to-peak voltage reduction to about 3% of that obtained during normal operation.

Conduction in horizontal driver transistor Q5 is prevented due to the reverse biasing of either diode D8 or diode D9. Operation of horizontal oscillator 32 during standby mode of operation will not therefore interfere with the free-running operation of SICOS power supply 20.

Standby power for remote control circuit 30 and horizontal oscillator 32 is derived from winding $W_c$ of horizontal driver transformer T2 by way of the current $i_2$ which charges capacitor C8 and capacitor C4 during standby operation. The average value of the positive portion of the current $i_2$, illustrated in FIG. 3f, amounts to about 150 milliamperes, amounting to about 1.8 watts of usable power at the output of the 12 volt regulator. The positive current $i_3$ in winding $W_b$ of transformer T2, illustrated in FIG. 3e, is induced by the current $i_2$. The current $i_3$ is higher in amplitude because winding $W_b$ has only about half the number of turns of winding $W_c$. For example, the inductance of winding $W_b$ may be about 200 microhenries, and thus, the inductance of winding $W_c$ may be about 800 microhenries.

Resistors R7 and R8 serve to smooth the base current $i_3$. Via resistor R7, some energy is stored in winding $W_c$ to lengthen the base current $i_3$ when D2 cuts off. Horizontal output transistor Q4 is kept safely in saturation until the current through its collector is zero.

To bring the television receiver back to normal operation, remote control circuit 30 applies a positive pulse, ON command signal to the base of switching transistor Q2 via control rail 31 for approximately 1 second until sufficient hold current for the transistor subsequently becomes available from hold rail 26. Deflection generator 21, including trace switch 27, is again connected to chassis ground 28 directly through switching transistor Q2, bringing ground potential to the emitter of horizontal output transistor Q4. As a result, the current $i_1'$ in flyback transformer winding W2 is bypassed to ground by transistor Q2 away from winding $W_c$ of driver transformer T2. As a result, current $i_2$ diminishes significantly; and horizontal output transistor Q4 is not in continuous saturated conduction.

The operation of SICOS power supply 20 changes to a start-up sequence of operation similar to that described in the aforementioned U.S. patent application of P. Haferl. This sequence is controlled by retrace ringing until the retrace voltage coupled to primary winding W1 of flyback transformer T1 is high enough in amplitude to reenable the SICOS regulator control circuit 22. With the regulator control circuit reenabled, the turn-off of output switch S1 is synchronized with horizontal retrace. At the same time, the retrace pulse voltage produces the saturation of transistor Q1, disabling the multivibrator network of resistors R1–R4 and capacitor C2.

During the transition from standby to ON operation, current $i_3$ changes from being induced by the current in winding $W_c$ of driver transformer T2 to being induced by the current in winding $W_a$. Similarly, during the transition from ON operation to standby, the current $i_3$ changes from being induced by winding $W_a$ to being induced by winding $W_c$. To make these transitions safely without damaging horizontal output transistor Q4, the switching sequence of transistor Q4 is not interrupted during the transitions. Transistor Q4 is not turned on when a significant positive voltage V3 is present at its collector.

In standby, horizontal oscillator 32 is operating, but is only in-circuit with the base of horizontal driver transistor Q5 when the voltage V4 is low. Current $i_1'$, when voltage V4 is low, flows in a negative direction, from the diode of Darlington transistor Q2. Thus, even though switching signals are being applied to the base of driver transistor Q5 in standby, only a small negative current $i_3$ flows and does not disturb operation of transistor Q4.

When current $i_1'$ becomes positive, voltage V4 goes high. Conduction in the collector of transistor Q5 is cut off by diodes D8 and D9. A positive current $i_3$ flows to keep transistor Q4 biased into saturation.

With the television receiver switched from standby to ON operation, transistor Q2 is switched into saturation. Immediately after receipt of the ON command signal, voltage $V_b$ is at zero volts, resulting in zero current $i_3$ to drive horizontal output transistor Q4. SICOS power supply circuit 20 continues to free run as during standby. The retrace circuit $L_H$, $C_R$ rings to produce an increasing amplitude voltage V3 at the retrace frequency during the interval $t_1$-$t_3$ of FIG. 3.

The automatic frequency and phase control portion of horizontal oscillator 32, not illustrated in FIG. 1, begins to phase the oscillator output to the phase of the ringing voltage V3. The increasing amplitude ringing voltage developed across retrace capacitor $C_R$ is coupled by way of flyback transformer winding W1 and control winding L1c of inductor L1 to the base of transistor Tr3 to turn that transistor on, thereby turning off transistor Tr1 of output switch S1. Therefore, the increasing amplitude ringing voltage V3 begins to synchronize the turn-off of switch S1 to the phase of the output of horizontal oscillator 32.

As the voltage $V_b$ increases, the already correctly phased oscillator 32 controls the switching of horizontal driver transistor Q5 to supply correctly phased base current $i_3$ to horizontal output transistor Q4. The increasing amplitude ringing voltage turns on transistor Q1, thereby disabling the multivibrator arrangement of resistors R1-R4 and capacitor C2, and at the same time enabling regulator control circuit 22. Once regulator control circuit 22 is enabled, the voltage V3 increases smoothly to its nominal steady-state ON value.

When the television receiver is switched from ON operation to standby, the transition is a controlled one and safely brings horizontal output transistor Q4 into saturated conduction on a continuous basis. When the OFF command signal is received, remote control transistor Q2 is switched off, thereby disabling operation of horizontal driver transistor Q5. If transistor Q2 happens to be turned off during retrace, the current induced in winding $W_b$ of driver transformer T2 from winding $W_a$ is higher than that induced from winding $W_c$. Horizontal output transistor Q4 remains in cutoff until the end of retrace. Subsequent thereto, transistor Q4 is maintained in continuous saturation.

For the first few milliseconds after receipt of the OFF command signal, operation of SICOS power supply 20 is at the lower free-running frequency described in the aforementioned U.S. patent application of P. Haferl. When capacitor C1 of FIG. 1 has discharged sufficiently to turn off transistor Q1, the multivibrator arrangement of resistors R1-R4 and capacitor C2 is enabled and increases the frequency of operation of SICOS switches S1 and S2 to a free-running frequency near that of the horizontal deflection frequency, as previously discussed.

The standby circuit arrangement of FIG. 1, just described, also provides short circuit and overload protection. Switching transistor Q2 is only controlled by ON-OFF command pulses provided from remote control circuit 30. When the transistor is turned on, it is held in saturation by the base current supplied from hold rail 26. A short circuit or an overload that produces a decrease in the voltage $V_b$ to a voltage below about 6.5 volts will turn off remote control switching transistor Q2 and place the television receiver and SICOS power supply 20 into a standby mode of operation. In the standby mode of operation, the voltage $V_b$ collapses completely, preventing the excessive current condition from continuing. Thus, the television receiver will in general return to the standby mode of operation under a persistent overload operating condition, even when repeated attempts are made to turn the television receiver on.

An example of horizontal driver transformer T2 is the following: Core: cylindrical 30×6 mm, material N27; $W_a$: 350 turns of 0.2 wire, 4 mH; $W_b$: 80 turns of 0.4 wire, 200 μH; $W_c$: 160 turns of 0.2 wire, 800 μH.

What is claimed is:

1. A television display system, responsive to the state of an ON-OFF command signal, comprising:
   a deflection winding;
   a deflection generator including a deflection output transistor means operable during normal mode to generate scanning current in said deflection winding;
   a switching power supply deflection synchronized by operation of said deflection generator during normal mode for providing power to said television display system; and
   means coupled to said deflection output transistor means and responsive to said ON-OFF command signal for providing base current thereto during the OFF-state of said command signal to substantially short-circuit said deflection generator during the OFF-state to change the operation of said switching power supply to a standby mode of operation.

2. A television display system according to claim 1 wherein said switching power supply in the standby mode of operation free runs to provide power at a substantially reduced power level.

3. A television display system according to claim 2 wherein said deflection generator includes a retrace resonant circuit for producing a retrace pulse voltage and wherein said switching power supply includes an inductance coupled to said retrace resonant circuit for transferring energy therebetween.

4. A television display system according to claim 3 wherein said switching power supply includes a source of voltage, output switching means coupled to said source and to said inductance and a control circuit for producing deflection synchronized operation of said output switching means during normal mode, said control circuit responsive to the generation of said retrace pulse voltage for producing free running of said output switching means in the absence thereof.

5. A television display system according to claim 1 including a source of input voltage, a switching power supply coupled to said source, a power transformer having a first winding coupled to said switching power supply and a second winding coupled to said deflection generator for transferring power from said source to said deflection generator during normal mode of operation, and a standby power supply for providing an operating supply voltage during standby mode of operation, with power flowing to said standby power supply through a short-circuit path produced by said ON-OFF command signal responsive means.

6. A television display system according to claim 5 wherein said switching power supply includes control circuitry that in the OFF-state of said command signal free-running operation of said switching power supply generate an alternating polarity voltage across said transformer second winding, with power flowing from second winding through said short-circuit path.

7. A television display system according to claim 6 wherein said ON-OFF command signal responsive means includes a controllable switch in parallel with said standby power supply to shunt power away from said standby power supply during normal mode of operation.

8. A television display system according to claim 6 wherein said switching power supply includes an inductance to store energy therein from said input voltage source, a retrace pulse voltage developed by said deflection generator being applied to said inductance during normal mode of operation to transfer energy stored in said inductance.

9. A television display system according to claims 1, 5 or 8 wherein said switching power supply includes output switching means coupled to said input voltage source, a reactive network coupled to said output switching means, and means responsive to a signal indicative of retrace pulse generation for activating said reactive network in the absence of said generation to produce said free-running operation.

10. A television display system according to claim 9 wherein the control circuitry of said switching power supply is responsive to a deflection rate signal during normal mode of operation to produce operation of said switching power supply in synchronism with scanning current generation and wherein said reactive network produces free-running operation during standby mode of operation at a frequency near that of the deflection frequency.

11. A television display system according to claim 5 wherein said short-circuit path is produced by the continuous conduction of said trace switch and wherein said ON-OFF command signal responsive means includes a second transformer having a first winding coupled to a control terminal of said trace switch and a second winding coupled to an output terminal of said trace switch and coupled to said standby power supply to provide positive feedback for maintaining the continuous conduction of said trace switch.

12. A television display system according to claim 11 wherein said ON-OFF command signal responsive means includes a controllable switch coupled to said trace switch to shunt current away from said second winding of said second transformer during normal mode of operation.

13. A television display system according to claims 11 or 12 including a deflection oscillator coupled to a third winding of said second transformer to produce the deflection rate switching of said trace switch during normal mode of operation.

14. A television display system, responsive to the state of a command signal having first and second states, comprising:
a deflection winding;
a deflection generator including a trace switch that in the first state of said command signal is switched at a deflection rate to generate scanning current in said deflection winding and produce a deflection rate energizing potential;
a load circuit coupled to said deflection generator and enabled by said energizing potential into a first state of operation; and
means coupled to a control terminal of said trace switch and responsive to said command signal for producing substantially continuous conduction in a main current path of said trace switch while said command signal is in said second state to place said load circuit in a second state of operation.

15. A television display system according to claim 14 including a source of current coupled to said trace switch and wherein said command signal responsive means comprises a bootstrapping transformer having a first winding coupled to a control terminal of said trace switch and a second winding coupled to a main current terminal of said trace switch and accepting current therethrough from said current source.

16. A television display system according to claim 15 including a source of standby voltage, said standby voltage source being energized by said bootstrapping transformer during the second state of said command signal.

17. A television display system according to claim 15 including a deflection oscillator coupled to a third winding of said bootstrapping transformer to produce the deflection rate switching of said trace switch during the first state of said command signal.

18. A television display system according to claims 14, 15, 16 or 17, including a source of input voltage, an inductance coupled to a retrace resonant circuit within said deflection generator so as to have applied to said inductance a retrace pulse voltage, output switching means coupled to said input voltage source and to said inductance, and a first control circuit responsive to a deflection rate signal for producing deflection synchronized switching of said output switching means during said first state of said command signal to transfer energy from said input voltage source to said retrace resonant circuit, said first control circuit responsive to said retrace pulse voltage for producing self-oscillation of said output switching means in the absence thereof.

19. A television display system according to claims 15 or 17 wherein said command signal responsive means includes a second switch coupled to said trace switch for bypassing current in said trace switch away from said bootstrapping transformer second winding during the first state of said command signal.

20. A television display system according to claim 19 wherein said deflection oscillator includes a driver switch coupled to said bootstrapping transformer third winding for applying a deflection rate signal to said bootstrapping transformer first winding during the first state of said command signal, said second switch being coupled to said driver switch to disable said driver switch during the second state of said command signal.

21. A television display system according to claim 20 including a source of standby voltage derived from the voltage developed across said bootstrapping transformer second winding during the second state of said command signal, said standby voltage energizing said deflection oscillator into oscillation.

22. A television display system according to claim 1 wherein said deflection generator includes a retrace resonant circuit for producing a retrace pulse voltage and wherein said switching power supply includes a flyback transformer having a first winding coupled to a switching element of said power supply and a second winding coupled to said retrace resonant circuit, and a control circuit coupled to said switching power supply and responsive to said ON-OFF command signal for placing said switching power supply in a free-running mode of operation in the OFF-state to transfer power in the OFF-state via said flyback transformer.

* * * * *

UNITED STATES PATENT AND TRADEMARK OFFICE
CERTIFICATE OF CORRECTION

PATENT NO. : 4,532,457

DATED : July 30, 1985

INVENTOR(S) : PETER EDUARD HAFERL

It is certified that error appears in the above-identified patent and that said Letters Patent is hereby corrected as shown below:

Column 8, line 66, that portion reading "signal" should read --signal produces--. Column 9, line 1, that portion reading "transformer" should read --power transformer--.

Signed and Sealed this

Ninth Day of September 1986

[SEAL]

Attest:

DONALD J. QUIGG

Attesting Officer

Commissioner of Patents and Trademarks